(12) United States Patent
Chun et al.

(10) Patent No.: US 12,313,745 B2
(45) Date of Patent: May 27, 2025

(54) METHOD OF DETECTING TUNNEL AND OVERPASS BY USING LIDAR SENSOR AND APPARATUS THEREFOR

(71) Applicant: Vueron Technology Co., Ltd, Seoul (KR)

(72) Inventors: Changhwan Chun, Seoul (KR); Jaekwang Kim, Bucheon-si (KR)

(73) Assignee: Vueron Technology Co., Ltd, Seoul (KR)

( * ) Notice: Subject to any disclaimer, the term of this patent is extended or adjusted under 35 U.S.C. 154(b) by 946 days.

(21) Appl. No.: 17/411,449

(22) Filed: Aug. 25, 2021

(65) Prior Publication Data
US 2022/0229191 A1 Jul. 21, 2022

(30) Foreign Application Priority Data
Jan. 19, 2021 (KR) .................. 10-2021-0007701

(51) Int. Cl.
  *G01S 17/931* (2020.01)
  *B60R 16/023* (2006.01)
  *G01S 17/42* (2006.01)
(52) U.S. Cl.
  CPC ........ *G01S 17/931* (2020.01); *B60R 16/0231* (2013.01); *G01S 17/42* (2013.01)
(58) Field of Classification Search
  CPC .... G01S 17/931; G01S 17/42; B60R 16/0231
  USPC ........................................................ 356/4.01
  See application file for complete search history.

(56) References Cited

U.S. PATENT DOCUMENTS

| | | | |
|---|---|---|---|
| 8,798,372 B1* | 8/2014 | Korchev | G06V 20/176 382/195 |
| 11,181,640 B2* | 11/2021 | Baker | G01S 7/487 |
| 2017/0023678 A1 | 1/2017 | Pink et al. | |
| 2020/0149892 A1* | 5/2020 | Yu | G01S 19/38 |
| 2021/0389463 A1* | 12/2021 | Jeong | G01S 17/931 |
| 2023/0311958 A1* | 10/2023 | Mazzone | B61L 15/0058 701/19 |

FOREIGN PATENT DOCUMENTS

KR 20140085140 A 7/2014

* cited by examiner

*Primary Examiner* — Isam A Alsomiri
*Assistant Examiner* — Kara M. Richter
(74) *Attorney, Agent, or Firm* — Bridgeway IP Law Group, PLLC; Jihun Kim

(57) ABSTRACT

A method of detecting a tunnel or an overpass performed by a tunnel detection apparatus. The method includes obtaining multi-layer data divided up and down from a LiDAR sensor and detecting entry or exit of the tunnel or the overpass around a moving object on which the tunnel detection apparatus is mounted based on distance information indicated by each of at least some layer data among the multi-layer data.

17 Claims, 7 Drawing Sheets

METHOD OF DETECTING TUNNEL AND OVERPASS BY USING LIDAR SENSOR AND APPARATUS THEREFOR

CROSS-REFERENCE TO RELATED APPLICATION

This application claims priority to Korean Patent Application No. 10-2021-0007701, filed on Jan. 19, 2021. The entire contents of the application on which the priority is based are incorporated herein by reference.

TECHNICAL FIELD

The present disclosure relates to a method of detecting a tunnel and an overpass and an apparatus therefor.

BACKGROUND

Light Detection And Ranging (LiDAR) is a technology that obtains distance information by measuring, using a high-power pulsed laser, the time of the laser beam that is reflected and returned from an object. The LiDAR has been used in various fields such as autonomous vehicles, global environment observation, atmospheric analysis, and unmanned devices, etc. Recently, as the LiDAR has been used as a core technology for 3D reverse engineering, laser scanners for autonomous driving and unmanned vehicles, and 3D image cameras, its utility and importance are gradually increasing.

In particular, unlike indoor robots that measure objects by using a single layer, a LiDAR sensor comprised of a multi-layer form is used in the autonomous vehicles for sturdily measuring the surroundings to support various safety services, considering the slope and grade of the road.

On the other hand, the autonomous vehicles understand the road by using the LiDAR sensor, camera, GPS equipment, etc. However, since satellite signals cannot reach tunnels among the roads, the tunnels are a special space of which a position cannot be detected by the GPS equipment and the expensive positioning equipment.

Conventionally, entry into or exit from the tunnel was detected by using the camera or the GPS, but in the case of detecting the tunnel by using the camera, accurate tunnel detection is impossible because the performance is greatly degraded according to the change in illumination, and it is difficult to measure accurate distance information. Further, in the case of detecting the tunnel by using the GPS, it is difficult to guarantee the performance of tunnel detection because an error may occur from 5 m to 20 m, and a number of connection failures occur according to the satellite reception state.

Therefore, a method of solving the detection error of other sensors and determining the accurate distance and time point of entry/exit of the tunnel is required.

SUMMARY

The problem to be solved by the present disclosure is to provide a method of detecting a tunnel or an overpass by using multi-layer data.

In accordance with an aspect of the present disclosure, there is provided a method of detecting a tunnel or an overpass performed by a tunnel detection apparatus. The method comprises, obtaining multi-layer data divided up and down from a LiDAR sensor; and detecting entry or exit of the tunnel or the overpass around a moving object on which the tunnel detection apparatus is mounted based on distance information indicated by each of at least some layer data among the multi-layer data.

Herein the detecting the entry or the exit of the tunnel or the overpass includes, detecting that the moving object is going to enter the tunnel or the overpass after traveling a distance determined by using distance information indicated by the at least some layer data if difference between the distance information indicated by each of the at least some layer data is smaller than or equal to a first predetermined difference.

Herein the detecting entry or exit of the tunnel or the overpass further includes, determining that the tunnel or the overpass is located around the moving object if distance information indicated by relatively upper layer data among the at least some layer data is greater than distance information indicated by relatively lower layer data, or if the number of layer data that is received among the at least some layer data is smaller than or equal to a predetermined number.

Herein the detecting entry or exit of the tunnel or the overpass further includes, determining that the moving object is about to enter the tunnel of the overpass, after detecting that the moving object is going to enter the tunnel or the overpass, if distance information indicated by relatively upper layer data among the at least some layer data is closer than distance information indicated by relatively lower layer data.

The method further comprises, compensating for a distance to the tunnel or the overpass from the moving object by using the distance to the tunnel or the overpass, a sensing period of the LiDAR sensor, and a speed of the moving object.

The method further comprises, detecting that the moving object is located inside the tunnel or the overpass, after entering the tunnel or the overpass, if distance information indicated by relatively upper data among the at least some layer data is closer than distance information indicated by relatively lower layer data.

Herein the detecting entry or exit of the tunnel or the overpass includes, detecting an end point of the tunnel based on at least one of whether the number of points, that is detected, included in uppermost layer data among the at least some layer data is smaller than a predetermined number, whether the points included in the uppermost layer data are distributed in a different form compared to a preceding frame, and whether variance of the points included in the uppermost layer data in a traveling direction of the moving object increases beyond a predetermined reference.

The method further comprises, compensating for a distance to the end point of the tunnel from the moving object by using the distance to the end point of the tunnel, a sensing period of the LiDAR sensor, and a speed of the vehicle.

Herein the detecting entry or exit of the tunnel or the overpass includes, determining that what the moving object entered was the overpass if the vehicle exits the tunnel or the overpass without detecting an end point of the tunnel or the overpass after entering the tunnel or the overpass.

In accordance with another aspect of the present disclosure, there is provided a tunnel detection apparatus. The tunnel detection apparatus comprises, a transceiver configured to obtain multi-layer data divided up and down from a LiDAR sensor; and a processor configured to control the transceiver, wherein the processor is configured to detect entry or exit of a tunnel or an overpass around a moving object on which the tunnel detection apparatus is mounted based on distance information indicated by each of at least some layer data among the multi-layer data.

In accordance with still another aspect of the present disclosure, there is provided a tunnel detection system. The tunnel detection system comprises, a LiDAR sensor configured to obtain multi-layer data divided up and down; and a tunnel detection apparatus configured to detect entry or exit of a tunnel or an overpass around a moving object on which the tunnel detection apparatus is mounted based on distance information indicated by each of at least some layer data among the multi-layer data.

In accordance with still another aspect of the present disclosure, there is provided a non-transitory computer-readable storage medium including computer executable instructions, wherein the instructions, when executed by a processor, cause the processor to perform a method of detecting a tunnel or an overpass performed by a tunnel detection apparatus. The method comprises, obtaining multi-layer data divided up and down from a LiDAR sensor; and detecting entry or exit of the tunnel or the overpass around a moving object on which the tunnel detection apparatus is mounted based on distance information indicated by each of at least some layer data among the multi-layer data.

According to an embodiment of the present disclosure, by detecting the tunnel or the overpass by using at least some layer data among the multi-layer data received from a LiDAR sensor, entry into, inside of, and exit from the tunnel or the overpass may be accurately detected.

DETAILED DESCRIPTION OF THE EMBODIMENTS

The advantages and features of embodiments and methods of accomplishing these will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

In describing the embodiments of the present disclosure, if it is determined that detailed description of related known components or functions unnecessarily obscures the gist of the present disclosure, the detailed description thereof will be omitted. Further, the terminologies to be described below are defined in consideration of functions of the embodiments of the present disclosure and may vary depending on a user's or an operator's intention or practice. Accordingly, the definition thereof may be made on a basis of the content throughout the specification.

Figure 1:
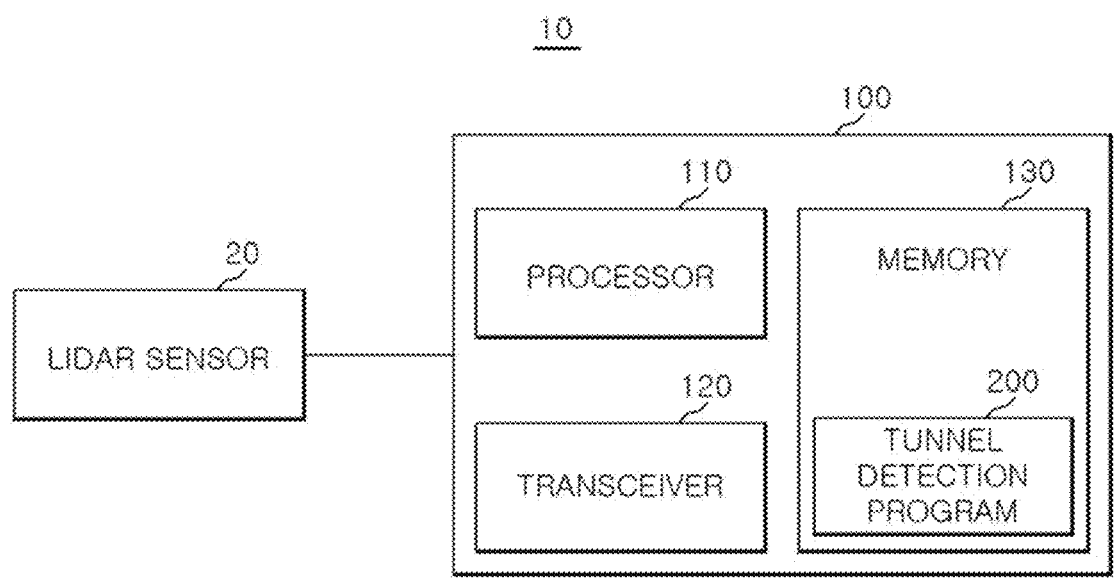
FIG. 1 shows a block diagram illustrating a tunnel detection system according to an embodiment of the present disclosure.

FIG. 1 shows a block diagram illustrating a tunnel detection system 10 according to an embodiment of the present disclosure.

Referring to FIG. 1, the tunnel detection system 10 may include a LiDAR sensor 20 and a tunnel detection apparatus 100.

In this application, for convenience of description, the tunnel detection system 10 is described as being mounted on an autonomous vehicle (hereinafter, it may be briefly referred to as a vehicle), but is not limited thereto. In other words, the tunnel detection system 10 may be mounted not only on the autonomous vehicle but also on an unmanned moving object such as a drone, and may be mounted on a moving object (for example, a car, a motorcycle, or an aircraft, etc.) other than the autonomous vehicle or the unmanned moving object.

In addition, in this application, the LiDAR sensor 20 is described as transmitting multi-layer data to the tunnel detection apparatus 100 as a separate device that is distinguished from the tunnel detection apparatus 100, but is not limited thereto. In other words, according to an embodiment, the LiDAR sensor 20 may be included in the tunnel detection apparatus 100, and in this case, the LiDAR sensor 20 may transmit the multi-layer data to a layer data receiving unit 210 to be described below through internal signaling or the like.

The LiDAR sensor 20 may emit a laser in a predetermined direction and may receive a reflected laser from a surrounding topographic object or the like.

In this case, the laser emitted by the LiDAR sensor 20 may include multiple layers divided up and down, and each of the multi-layers may include one or more points. Accordingly, the LiDAR sensor 20 may emit a laser including a plurality of points, each of which is distinguished by layers, and may receive multi-layer data including a plurality of points that hit and are reflected from the surrounding topographic object or the like.

The tunnel detection apparatus 100 may receive layer data from the LiDAR sensor 20, and may detect a tunnel or an overpass located around the tunnel detection apparatus 100 (or the vehicle on which the tunnel detection apparatus 100 is mounted), more specifically, located in a direction of movement of the tunnel detection apparatus 100 by using distance information indicated by the received layer data.

In more detail, the tunnel detection apparatus 100 may detect whether the vehicle enters the tunnel or the overpass, whether the vehicle is inside the tunnel or the overpass, or whether the vehicle exits the tunnel or the overpass by using distance information indicated by the received layer data. Therefore, in this application, detecting the tunnel or the overpass may indicate at least one of detecting entry into, inside of, and exit from the tunnel or the overpass.

To this end, the tunnel detection apparatus 100 may include a processor 110, a transceiver 120, and a memory 130.

The processor 110 may generally control an operation of the tunnel detection apparatus 100.

The processor 110 may receive the multi-layer data from the LiDAR sensor 20 by using the transceiver 120.

In this application, the tunnel detection apparatus 100 is described as receiving the multi-layer data by using the transceiver 120, but is not limited thereto. In other words, according to an embodiment, the tunnel detection apparatus 100 may include an input/output device (not illustrated) and may receive the multi-layer data by using the input/output device. Further, the LiDAR sensor 20 is included in the tunnel detection apparatus 100, and thus the multi-layer data may be generated in the tunnel detection apparatus 100.

The memory 130 may store a tunnel detection program 200 and information used for executing the tunnel detection program 200.

In this application, the tunnel detection program 200 may indicate software including instructions programmed to detect the tunnel or the overpass by using the distance information indicated by the multi-layer data.

The processor 110 may load the tunnel detection program 200 and information used for executing the tunnel detection program 200 from the memory 130 in order to execute the tunnel detection program 200.

The processor 110 may execute the tunnel detection program 200, thereby detecting the tunnel or the overpass located around the tunnel detection apparatus 100 by using the distance information indicated by the received layer data.

The function and/or the operation of the tunnel detection program 200 will be described in detail with reference to FIG. 2.

Figure 2:
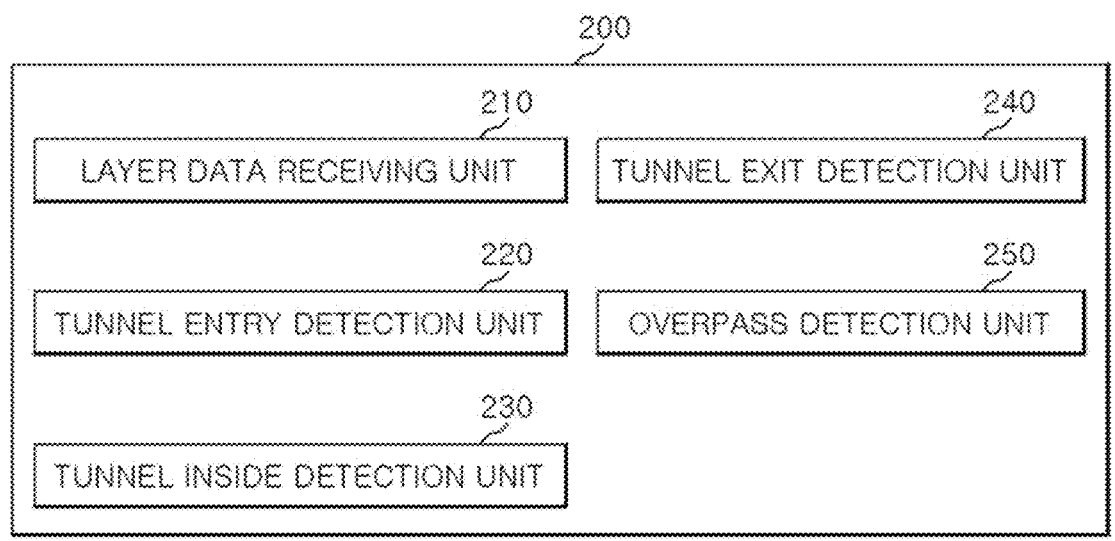
FIG. 2 shows a block diagram illustrating a function of a tunnel detection program according to an embodiment of the present disclosure.

FIG. 2 shows a block diagram illustrating a function of the tunnel detection program 200 according to an embodiment of the present disclosure.

Referring to FIG. 2, the tunnel detection program 200 may include the layer data receiving unit 210, a tunnel entry detection unit 220, a tunnel inside detection unit 230, a tunnel exit detection unit 240, and an overpass detection unit 250.

The layer data receiving unit 210, the tunnel entry detection unit 220, the tunnel inside detection unit 230, the tunnel exit detection unit 240, and the overpass detection unit 250 shown in FIG. 2 indicate each of conceptually divided functions of the tunnel detection program 200 in order to easily describe the functions of the tunnel detection program 200, and are not limited thereto. According to embodiments, the functions of the layer data receiving unit 210, the tunnel entry detection unit 220, the tunnel inside detection unit 230, the tunnel exit detection unit 240, and the overpass detection unit 250 may be combined or separated, and may be implemented as a series of instructions included in a single program.

The layer data receiving unit 210 may receive multi-layer data from the LiDAR sensor 20. The layer data receiving unit 210 may generate distance information indicated by the multi-layer data by using the received multi-layer data.

Each of the tunnel entry detection unit 220, the tunnel inside detection unit 230, the tunnel exit detection unit 240, and the overpass detection unit 250 may detect a tunnel or an overpass around a vehicle on which the tunnel detection apparatus 100 is mounted by using the distance information generated by the layer data receiving unit 210. Hereinafter, a method of detecting the tunnel or the overpass will be described by dividing into entry detection, inside detection, exit detection, and overpass detection.

<Detection of Entry of Tunnel or Overpass>

The tunnel entry detection unit 220 may detect a situation in which the vehicle on which the tunnel detection apparatus 100 is mounted will enter the tunnel or the overpass by using distance information indicated by at least some layer data among the multi-layer data received by the layer data receiving unit 210.

In this application, the distance information indicated by the layer data may represent an average value of distance information indicated by each of one or more points included in the layer data. This is because each layer data includes one or more points, and each point may be reflected from a surrounding topographic object, thereby indicating distance from the topographic object.

In more detail, if distance information indicated by relatively upper layer data among the at least some layer data is greater or farther than distance information indicated by relatively lower layer data, or if the number of layer data that is reflected and then received among the at least some layer data is less than or equal to a predetermined number, the tunnel entry detection unit 220 may determine that the tunnel or the overpass is located at a long distance.

Thereafter, if the distance information indicated by each of the at least some layer data is identical to each other or if difference thereof is less than a predetermined value, the tunnel entry detection unit 220 may determine that the tunnel or the overpass is located at a distance determined by using the distance information indicated by each of the at least some layer data. In other words, the tunnel entry detection unit 220 may determine that the vehicle will enter the tunnel or the overpass after traveling the distance determined by using the distance information indicated by each of the at least some layer data.

Thereafter, if the distance information indicated by relatively upper layer data among the at least some layer data is closer than the distance information indicated by relatively lower layer data, the tunnel entry detection unit 220 may determine that the vehicle is about to enter the tunnel or the overpass.

This is because, in general, a tunnel or an overpass has a cave-shaped entrance in a direction in which the road is placed, and a topographic object such as a mountain, a bridge, or the like is positioned above the entrance. If a laser beam emitted by the LiDAR sensor 20 hits the topographic object above the entrance, it may be reflected, however if the vehicle is too close to or too far from the tunnel or the overpass, the laser beam emitted by the LiDAR sensor 20 may not hit the topographic object above the entrance, and thus may not be reflected.

Herein, at least some layer data among the multi-layer data may be used for detecting a tunnel or an overpass. This is because there may be an inappropriate layer for detection of the tunnel or the overpass according to an angle at which each of the multiple layers is emitted, or there may be an appropriate layer for detection of the tunnel or the overpass among the multiple layers according to the angle at which each of the multiple layers is emitted.

Figure 3A:
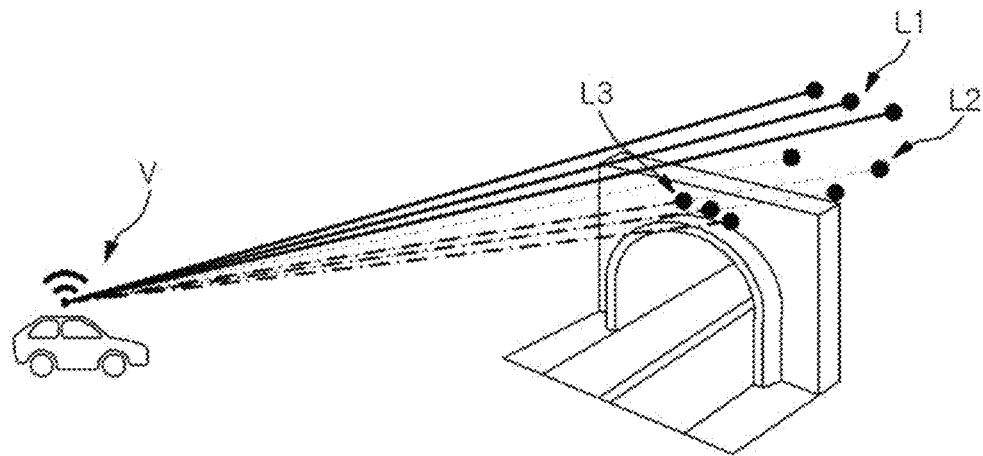
FIG. 3A shows a diagram illustrating a method in which a tunnel entry detection unit detects entry of a tunnel or an overpass according to an embodiment of the present disclosure.
Figure 3B:
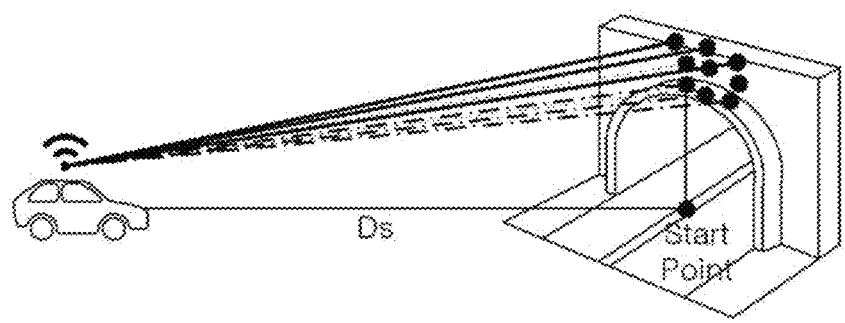
FIG. 3B shows a diagram illustrating a method in which a tunnel entry detection unit detects entry of a tunnel or an overpass according to an embodiment of the present disclosure.
Figure 3C:
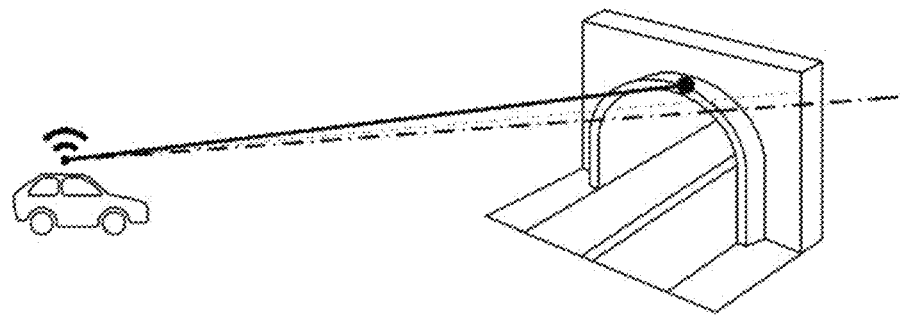
FIG. 3C shows a diagram illustrating a method in which a tunnel entry detection unit detects entry of a tunnel or an overpass according to an embodiment of the present disclosure.

For example, referring to FIGS. 3A, 3B and 3C, when the LiDAR sensor 20 emits a laser including multiple layers in a traveling direction of a vehicle V, first layer data L1, second layer data L2, and third layer data L3 which are upper layers among the multiple layers may be used for detecting the tunnel or the overpass.

At this time, as shown in FIG. 3A, in a case of which the tunnel or the overpass is far from the vehicle V, because the first layer data L1 and the second layer data L2 are reflected from a topographic object or an overpass structure, etc. above a tunnel wall other than from the tunnel wall, and the third layer data L3 is reflected from the tunnel wall, distance information indicated by each of the first layer data L1, the second layer data L2, and the third layer data L3 may be the greatest in order. Therefore, as described above, if distance information indicated by relatively upper layer data is farther than distance information indicated by relatively lower layer data or if part of at least some layer data is reflected, the tunnel entry detection unit 220 may determine that the tunnel or the overpass is located at a long distance.

Thereafter, as shown in FIG. 3B, if the vehicle V continues to move and approaches the tunnel or the overpass, all the first layer data L1, the second layer data L2, and the third layer data L3 may be reflected from the tunnel wall or the overpass structure, etc. If the tunnel wall is formed perpendicular to the ground, each distance information indicated by the first layer data L1, the second layer data L2, and the third layer data L3 is substantially identical to each other, or an error may be less than or equal to a predetermined value. Therefore, in this case, the tunnel entry detection unit 220 may determine that the tunnel or the overpass is at a distance determined by using the distance information indicated by the first layer data L1, the second layer data L2, and the third layer data L3.

For example, the tunnel entry detection unit 220 may determine the location of the tunnel or the overpass by using Equation 1 below.

$$Ds = (d1 + d2 + d3)/3 \quad \text{[Equation 1]}$$

Herein, Ds indicates a distance to the tunnel or the overpass, d1 indicates distance information of the first layer data L1, d2 indicates distance information of the second layer data L2, and d3 indicates distance information of the third layer data L3.

In other words, the location of the tunnel or the overpass (i.e., a distance between the tunnel detection apparatus 100 and the tunnel or the overpass) may be determined by an average of the distance information indicated by the layer data L1, L2 and L3 used for detecting the tunnel or the overpass.

After calculating the distance to the tunnel or the overpass by using Equation 1, the tunnel entry detection unit 220 may calculate a distance that the vehicle V traveled by using a sensing period (for example, 100 ms) of the LiDAR sensor 20 and a speed (for example, 60 km/h) of the vehicle V, and may compensate for the distance between the vehicle V and the tunnel or the overpass by subtracting the distance that the vehicle V traveled from the distance to the tunnel or the overpass calculated by using Equation 1.

Thereafter, as shown in FIG. 3C, if the vehicle V continues to move and further approaches the tunnel or the overpass, the first layer data L1 may be reflected from the tunnel wall or the overpass structure, etc., but the second layer data L2 and the third layer data L3 may be reflected not from the tunnel wall but from a ceiling inside the tunnel. In this case, the third layer data L3 may be reflected from a ceiling at a farther distance than the second layer data L2. Therefore, as described above, if the distance information indicated by the first layer data L1 is smaller or shorter than the distance information indicated by the second layer data L2, and the distance information indicated by the second layer data L2 is smaller or shorter than the distance information indicated by the third layer data L3, the tunnel entry detection unit 220 may determine that the vehicle V is about to enter the tunnel or the overpass.

In this application, for convenience of description, the tunnel entry detection unit 220 is described as detecting the entry of the tunnel in an order of detection of the tunnel or the overpass at a long distance (which corresponds to FIG. 3A), detection of a distance Ds to the tunnel or the overpass (which corresponds to FIG. 3B), and detection of expected entry of the tunnel or the overpass (which corresponds to FIG. 3C), but is not limited thereto.

In other words, depending on a driving environment, the tunnel entry detection unit 220 may not perform at least one of detection of the tunnel or the overpass at the long distance, detection of the distance Ds to the tunnel or the overpass, and detection of the expected entry of the tunnel or the overpass. Accordingly, in this case, even if at least one of above detections is not performed, the tunnel entry detection unit 220 may determine that the entry of the tunnel or the overpass is detected if one of corresponding detections is performed.

For example, if the distance Ds to the tunnel or the overpass is detected, the tunnel entry detection unit 220 may determine that the tunnel or the overpass is located at the detected distance even if the tunnel or the overpass at the long distance is not detected.

<Detection of Inside of Tunnel>

The tunnel inside detection unit 230 may detect whether the vehicle V on which the tunnel detection apparatus 100 is mounted is inside the tunnel by using distance information indicated by at least some layer data among the multi-layer data received by the layer data receiving unit 210.

In more detail, if distance information indicated by relatively upper layer data among the at least some layer data used for detecting the tunnel or the overpass is smaller or closer than distance information indicated by relatively lower layer data, the tunnel inside detection unit 230 may determine that the vehicle V is inside the tunnel.

This is because that, if the vehicle V is inside the tunnel, a laser emitted by the LiDAR sensor 20 hits the ceiling of the tunnel and is reflected, and the relatively upper layer data is reflected from a relatively closer ceiling surface whereas the relatively lower layer data is reflected from a relatively farther ceiling surface.

Figure 4A:
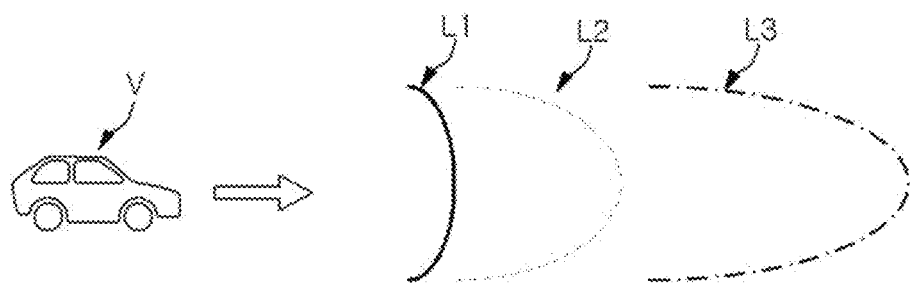
FIG. 4A shows a diagram illustrating a method in which a tunnel inside detection unit detects inside of a tunnel according to an embodiment of the present disclosure.

Referring to FIG. 4A, when the LiDAR sensor 20 emits a laser in multiple layers in the traveling direction of the vehicle V, if distance information indicated by the first layer data L1 is smaller than distance information indicated by the second layer data L2, and the distance information indicated by the second layer data L2 is smaller than distance information indicated by the third layer data L3, the tunnel inside detection unit 230 may determine that the vehicle V is inside the tunnel.

At this time, since a ceiling surface from which each of the third layer data L3, the second layer data L2, and the first layer data L1 is reflected may be the farthest in order, it may be seen that points included in the first layer data L1 are distributed in a narrower range than points included in the second layer data L2, and the points included in the second layer data L2 are distributed in a narrower range than points included in the third layer data L3.

In addition, according to an embodiment, if distance information of a lateral direction (i.e., a left-right direction based on the traveling direction of the vehicle V) that is wider than a predetermined distance is not detected in the at least some layer data used for detecting the tunnel or the overpass, the tunnel inside detection unit 230 may determine that the vehicle V is inside the tunnel.

This is because that distance information of the lateral direction that is wider than lanes of the road may be detected outside the tunnel, but distance information of the lateral direction that is as wide as the lanes of the road may be detected inside the tunnel. Therefore, if the distance information of the lateral direction that is wider than the lanes of the road is not detected, the tunnel inside detection unit 230 may determine that the vehicle V is inside the tunnel.

Figure 4B:
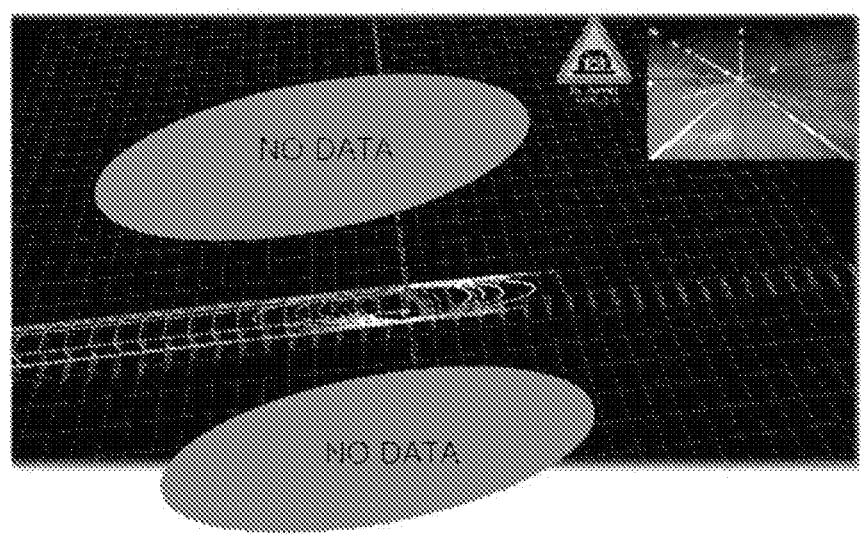
FIG. 4B shows a diagram illustrating a method in which a tunnel inside detection unit detects inside of a tunnel according to an embodiment of the present disclosure.

For example, referring to FIG. 4B, it may be seen that the distance information of the lateral direction that is wider than the lanes of the road is not detected in the tunnel. Therefore, it may be seen that whether the distance information of the lateral direction that is wider than the predetermined distance is detected may also be a criterion to determine that the vehicle V is inside the tunnel.

<Detection of Exit of Tunnel>

The tunnel exit detection unit 240 may detect that the vehicle V on which the tunnel detection apparatus 100 is mounted is about to exit the tunnel by using distance information indicated by at least some layer data among the multi-layer data received by the layer data receiving unit 210.

In more detail, if at least one of following three conditions is satisfied, the tunnel exit detection unit 240 may determine that an end point of the tunnel is detected, and thus detect that the vehicle V on which the tunnel detection apparatus 100 is mounted is about to exit the tunnel.

Condition 1: The detected number of points included in uppermost layer data among the at least some layer data used for detecting the tunnel is smaller than a predetermined number.

Condition 2: Points included in the uppermost layer data are distributed in a significantly different form compared to a preceding frame.

Condition 3: Variance of points included in the uppermost layer data in the traveling direction of the vehicle V increases beyond a predetermined reference.

All the conditions 1 through 3 are for determining whether the uppermost layer data reached the end point of the tunnel. In a case of which the uppermost layer data reached the end point of the tunnel, and thus is not reflected from the ceiling surface, an environment in which layer data is reflected changes rapidly compared to inside of the tunnel, and thus the number of points detected by the LiDAR sensor 20 or distribution of points may change rapidly.

Therefore, the tunnel exit detection unit 240 may determine that a frame immediately preceding a frame in which uppermost layer data satisfies at least one of the conditions 1 through 3 corresponds to the end point of the tunnel.

Figure 5:
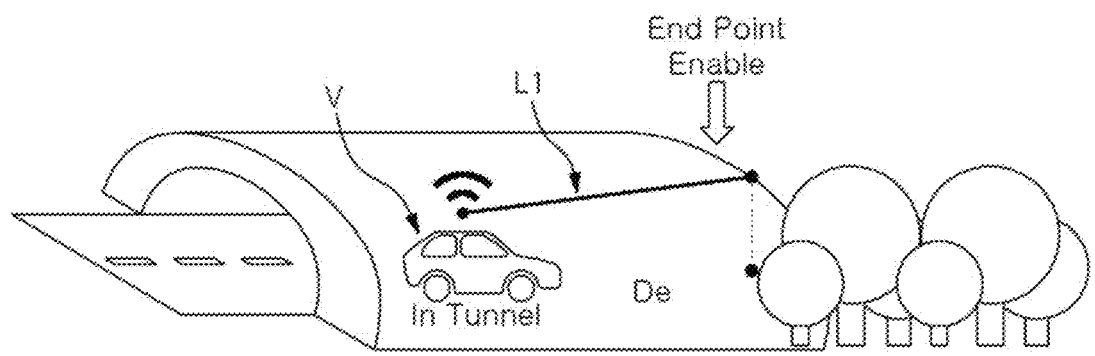
FIG. 5 shows a diagram illustrating a method in which a tunnel exit detection unit detects an end point of a tunnel according to an embodiment of the present disclosure.

Referring to FIG. 5, the tunnel exit detection unit 240 may calculate a distance to the end point of the tunnel from the vehicle V on which the tunnel detection apparatus 100 is mounted in the immediately preceding frame by using the distance information indicated by the uppermost layer data in the immediately preceding frame (for example, an average of distance information indicated by points included in the uppermost layer data in the immediately preceding frame), compensate for a traveling distance of the vehicle V (for example, a traveling distance calculated by using a sensing period of the LiDAR sensor 20 and a speed of the vehicle V) during one frame, and calculate a distance De to the end point of the tunnel in the present frame.

The tunnel exit detection unit 240 may calculate a time point at which the vehicle V will exit the tunnel by using the distance De to the end point of the tunnel and the traveling distance of the vehicle V.

According to an embodiment, if all layer data lower than the uppermost layer data among the layer data used for detecting the tunnel satisfy at least one of the conditions 1 through 3, the tunnel exit detection unit 240 may detect that the vehicle V on which the tunnel detection apparatus 100 is mounted is about to exit the tunnel. This is because if the uppermost layer data reaches the end point of the tunnel, it may be determined that other layer data lower than the uppermost layer data has already left the tunnel.

<Detection of Overpass>

The overpass detection unit 250 may detect that what the vehicle V on which the tunnel detection apparatus 100 is mounted entered was the overpass (i.e., under the overpass) by using distance information indicated by at least some layer data among the multi-layer data received by the layer data receiving unit 210.

In more detail, after entering the tunnel or the overpass (i.e., after traveling the distance Ds to the tunnel or the overpass that is determined by the tunnel entry detection unit 220), if the vehicle V exits the tunnel or the overpass before the tunnel exit detection unit 240 determines a time point at which the vehicle V will exit the tunnel or the overpass (i.e., the end point of the tunnel was not detected), the overpass detection unit 250 may detect that what the vehicle V entered was the overpass.

This is because the width of the overpass is determined according to the number of lanes of the overpass, and thus it is much shorter than the length of tunnel. In other words, the tunnel inside detection unit 230 may detect whether the vehicle V is inside the tunnel or not after the vehicle V on which the tunnel detection apparatus 100 is mounted traveled the distance to the tunnel or the overpass that is determined by the tunnel entry detection unit 220. However, in the case of the overpass, since the width of the overpass is narrow, the uppermost layer data may not be reflected from the ceiling surface of the tunnel or the overpass.

Since the uppermost layer data is not reflected from the ceiling of the tunnel or the overpass, the tunnel exit detection unit 240 may not detect the end point of the tunnel. Therefore, if the vehicle V exits the tunnel or the overpass without detecting the end point of the tunnel after the vehicle V on which the tunnel detection apparatus 100 is mounted entered the tunnel or the overpass, the overpass detection unit 250 may detect that what the vehicle entered was the overpass (i.e., under the overpass).

Figure 6:
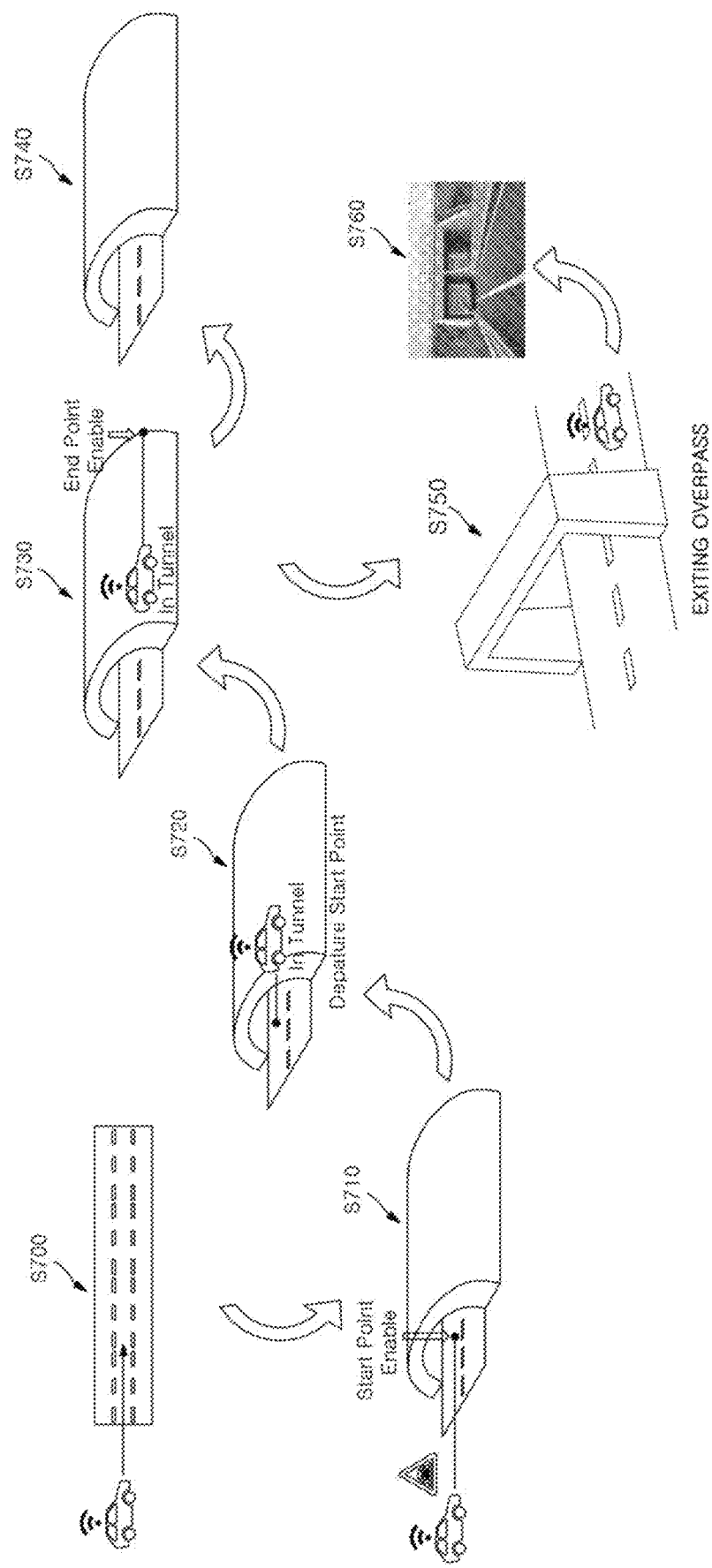
FIG. 6 shows a diagram illustrating a situation in which a tunnel detection apparatus detects a tunnel or an overpass according to an embodiment of the present disclosure.
Figure 7:
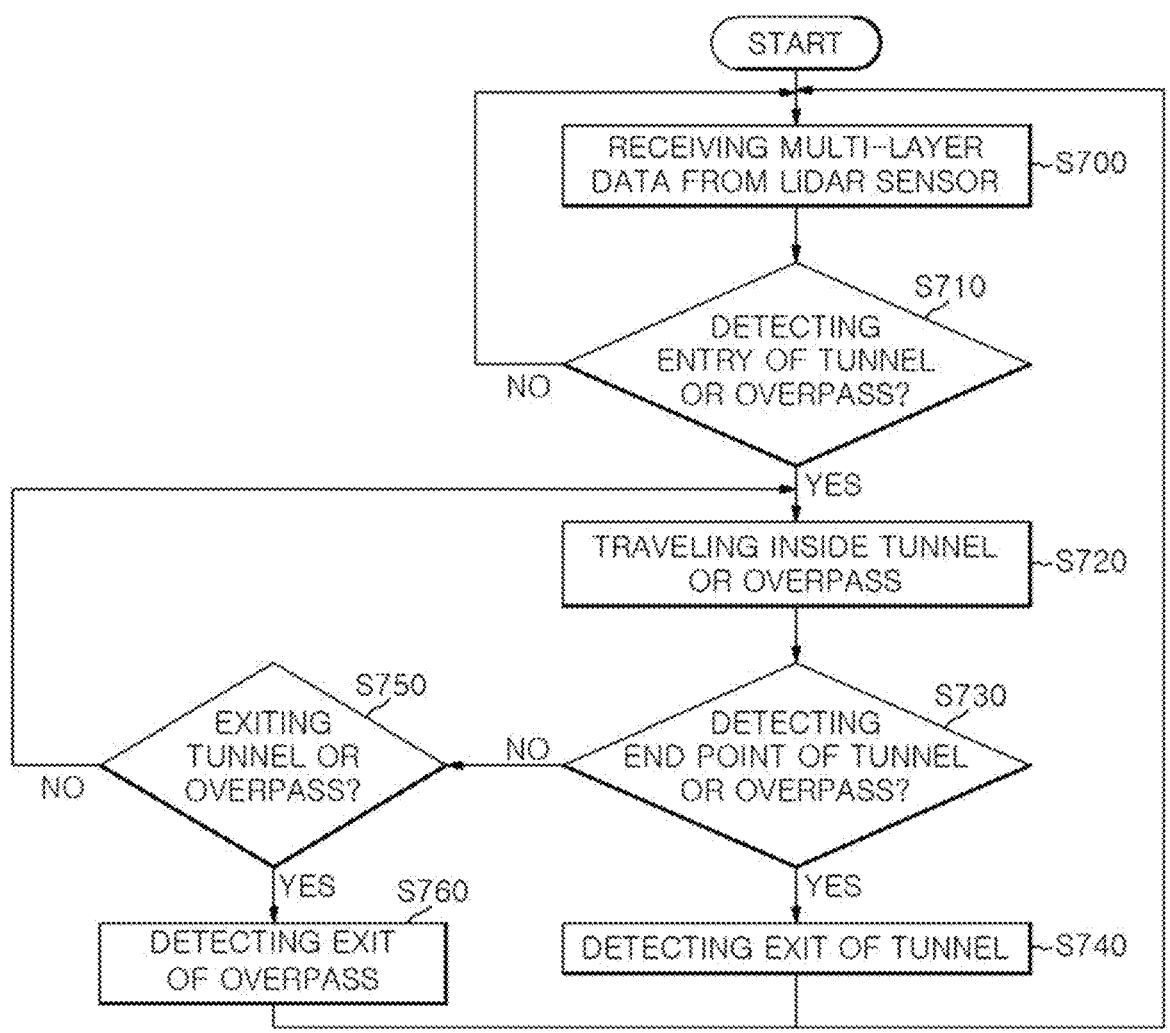
FIG. 7 shows a flowchart illustrating a method in which a tunnel detection apparatus detects a tunnel or an overpass according to an embodiment of the present disclosure.

FIG. 6 shows a diagram illustrating a situation in which the tunnel detection apparatus 100 detects a tunnel or an overpass according to an embodiment of the present disclosure, and FIG. 7 shows a flowchart illustrating a method in which the tunnel detection apparatus 100 detects a tunnel or an overpass according to an embodiment of the present disclosure.

Referring to FIGS. 2, 6, and 7, in a step S700, the layer data receiving unit 210 may receive multi-layer data from the LiDAR sensor 20.

In a step S710, if a difference between the distance information indicated by each of at least some layer data among the multi-layer data is less than or equal to a predetermined value, the tunnel entry detection unit 220 may detect that the vehicle V will enter the tunnel or the overpass after traveling the distance determined by using distance information indicated by each of the at least some layer data.

Thereafter, in a step S720, if distance information indicated by relatively upper layer data among the at least some layer data used for detecting the tunnel or the overpass is smaller or closer than distance information indicated by relatively lower layer data, the tunnel inside detection unit 230 may determine that the vehicle V is inside the tunnel.

Thereafter, if an end point of the tunnel is detected in a step S730, the tunnel exit detection unit 240 may detect that the vehicle V on which the tunnel detection apparatus 100 is mounted is about to exit the tunnel in a step S740.

On the other hand, if it is determined that the end point of the tunnel is not detected in the step S730, and the vehicle V exited the tunnel or the overpass in a step S750, it may be determined that, in a step S760, what the overpass detection unit 250 on which the tunnel detection apparatus 100 is mounted entered was the overpass.

After exiting the tunnel or the overpass, the tunnel detection apparatus 100 may prepare for detecting a tunnel or an overpass while continuously receiving multi-layer data by using the LiDAR sensor 20 in the step S700.

According to an embodiment of the present disclosure, by detecting a tunnel or an overpass by using at least some layer data among multi-layer data received from the LiDAR sensor 20, entry into, inside of, and exit from the tunnel or the overpass may be accurately detected.

In other words, the present disclosure may not only detect a tunnel and an overpass but also determine accurate time point of entry or exit of the tunnel or the overpass and whether the vehicle V is inside the tunnel or the overpass, thereby improving utilization of tunnel detection. The present disclosure may be used to develop technologies for localization, path estimation, and situation assessment for a GPS-shadow area that may occur when operating an autonomous driving system, and may be used to solve the problem of performance degradation of the existing ADAS system that may occur in the tunnel. In addition, the present disclosure may contribute to providing a safe and convenient driving environment to drivers through grafting onto drivers' convenience device.

Unlike conventional detection methods using other sensors, since the present disclosure may detect an accurate location of the tunnel based on accurate distance information, it may be used as a key function in improving the performance of various systems.

Combinations of each block of the block diagram and each step of the flowchart in the present disclosure may be performed by computer program instructions. Since these computer program instructions may be mounted on an encoding processor of a general-purpose computer, a special purpose computer, or other programmable data processing equipment, a means by which the instructions executed by the encoding processor of the computer or other programmable data processing equipment performs the functions described in each block of the block diagram or each step in the flowchart may be generated. Since these computer program instructions may be stored in computer-usable or computer-readable memory that may be directed to the computer or other programmable data processing equipment to implement a function in a particular way, the instructions stored in the computer-usable or computer-readable memory may produce manufactures including an instruction means for performing the functions described in each block of the block diagram or each step of the flowchart. Since the computer program instructions may be mounted on the computer or other programmable data processing equipment, instructions that operate the computer or other programmable data processing equipment by generating a process in which a series of operational steps are performed on the computer or other programmable data processing equipment and executed by the computer may provide steps of performing the functions described in each block of the block diagram and each step of the flowchart.

In addition, each block or each step may represent a part of a module, segment, or code that includes one or more executable instructions for executing specified logical function(s). Further, it may be noted that in some alternative embodiments, functions described in blocks or steps may occur regardless of the described order. For example, two blocks or two steps shown in succession may be performed substantially simultaneously, or sometimes be performed in the reverse order depending on the corresponding function.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. A method of detecting a tunnel or an overpass performed by a tunnel detection apparatus, the method comprising:
   obtaining multi-layer data divided up and down from a LiDAR sensor; and
   detecting an entry or an exit of the tunnel or the overpass around a moving object on which the tunnel detection apparatus is mounted based on distance information indicated by each of at least some layer data among the multi-layer data,
   wherein the detecting of the entry or the exit of the tunnel or the overpass includes determining that what the moving object entered was the overpass when the moving object exits the tunnel or the overpass without detecting an end point of the tunnel or the overpass after entering the tunnel or the overpass.

2. The method of claim 1, wherein the detecting of the entry or the exit of the tunnel or the overpass includes detecting that the moving object is going to enter the tunnel or the overpass after traveling a distance determined by using distance information indicated by the at least some layer data when a difference between the distance information indicated by the at least some layer data is smaller than or equal to a first predetermined difference.

3. The method of claim 2, wherein the detecting of the entry or exit of the tunnel or the overpass further includes determining that the tunnel or the overpass is located around the moving object when a distance information indicated by relatively upper layer data among the at least some layer data is greater than a distance information indicated by relatively lower layer data, or when a number of layer data that is received among the at least some layer data is smaller than or equal to a predetermined number.

4. The method of claim 2, wherein the detecting of the entry or exit of the tunnel or the overpass further includes determining that the moving object is about to enter the tunnel or the overpass, after detecting that the moving object is going to enter the tunnel or the overpass, when a distance information indicated by relatively upper layer data among the at least some layer data is closer than a distance information indicated by relatively lower layer data.

5. The method of claim 2, further comprising compensating for a distance to the tunnel or the overpass from the moving object by using the distance to the tunnel or the overpass, a sensing period of the LiDAR sensor, and a speed of the moving object.

6. The method of claim 1, further comprising detecting that the moving object is located inside the tunnel or the overpass, after entering the tunnel or the overpass, when a distance information indicated by relatively upper data among the at least some layer data is closer than a distance information indicated by relatively lower layer data.

7. The method of claim 1, wherein the detecting of the entry or exit of the tunnel or the overpass includes detecting an end point of the tunnel based on whether a number of points, that is detected, included in uppermost layer data among the at least some layer data is smaller than a predetermined number or whether a variance of the points included in the uppermost layer data in a traveling direction of the moving object increases beyond a predetermined reference.

8. The method of claim 7, further comprising compensating for a distance to the end point of the tunnel from the moving object by using the distance to the end point of the tunnel, a sensing period of the LiDAR sensor, and a speed of the moving object.

9. A tunnel detection apparatus comprising:
a transceiver configured to obtain multi-layer data divided up and down from a LiDAR sensor; and
a processor coupled to the transceiver and the processor configured to:
  detect an entry or an exit of a tunnel or an overpass around a moving object on which the tunnel detection apparatus is mounted based on distance information indicated by each of at least some layer data among the multi-layer data; and
  determine that what the moving object entered was the overpass when the moving object exits the tunnel or the overpass without detecting an end point of the tunnel or the overpass after entering the tunnel or the overpass.

10. The tunnel detection apparatus of claim 9, wherein the processor is further configured to detect that the moving object is going to enter the tunnel or the overpass after traveling a distance determined by using distance information indicated by the at least some layer data when a difference between the distance information indicated by each of the at least some layer data is smaller than or equal to a first predetermined difference.

11. The tunnel detection apparatus of claim 10, wherein the processor is further configured to determine that the tunnel or the overpass is located around the moving object when a distance information indicated by relatively upper layer data among the at least some layer data is greater than distance information indicated by relatively lower layer data, or when a number of layer data that is received among the at least some layer data is smaller than or equal to a predetermined number.

12. The tunnel detection apparatus of claim 10, wherein the processor is further configured to determine that the moving object is about to enter the tunnel or the overpass, after detecting that the moving object is going to enter the tunnel or the overpass, when a distance information indicated by relatively upper layer data among the at least some layer data is closer than distance information indicated by relatively lower layer data.

13. The tunnel detection apparatus of claim 10, wherein the processor is further configured to compensate for a distance to the tunnel or the overpass from the moving object by using the distance to the tunnel or the overpass, a sensing period of the LiDAR sensor, and a speed of the moving object.

14. The tunnel detection apparatus of claim 9, wherein the processor is further configured to detect that the moving object is located inside the tunnel or the overpass, after entering the tunnel or the overpass, when a distance information indicated by relatively upper data among the at least some layer data is closer than distance information indicated by relatively lower layer data.

15. The tunnel detection apparatus of claim 9, wherein the processor is further configured to detect an end point of the tunnel based on whether a number of points, that is detected, included in uppermost layer data among the at least some layer data is smaller than a predetermined number or whether a variance of the points included in the uppermost layer data in a traveling direction of the moving object increases beyond a predetermined reference.

16. The tunnel detection apparatus of claim 15, wherein the processor is further configured to compensate for a distance to the end point of the tunnel from the moving object by using the distance to the end point of the tunnel, a sensing period of the LiDAR sensor, and a speed of the moving object.

17. A tunnel detection system, comprising:
a LiDAR sensor configured to obtain multi-layer data divided up and down; and
a tunnel detection apparatus configured to detect an entry or an exit of a tunnel or an overpass around a moving object on which the tunnel detection apparatus is mounted based on distance information indicated by each of at least some layer data among the multi-layer data and determine that what the moving object entered was the overpass when the moving object exits the tunnel or the overpass without detecting an end point of the tunnel or the overpass after entering the tunnel or the overpass.

* * * * *